United States Patent
Han et al.

(10) Patent No.: US 12,425,110 B2
(45) Date of Patent: Sep. 23, 2025

(54) MULTIPLE-INPUT MULTIPLE-OUTPUT OVER THE AIR PERFORMANCE TESTING

(71) Applicant: QUALCOMM Incorporated, San Diego, CA (US)

(72) Inventors: Bin Han, Beijing (CN); Yiqing Cao, Beijing (CN); Yan Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 552 days.

(21) Appl. No.: 17/756,692

(22) PCT Filed: Jan. 6, 2020

(86) PCT No.: PCT/CN2020/070406
§ 371 (c)(1),
(2) Date: May 31, 2022

(87) PCT Pub. No.: WO2021/138755
PCT Pub. Date: Jul. 15, 2021

(65) Prior Publication Data
US 2023/0028870 A1    Jan. 26, 2023

(51) Int. Cl.
*H04B 17/00*    (2015.01)
*H04B 7/0426*   (2017.01)
(Continued)

(52) U.S. Cl.
CPC ....... *H04B 17/0085* (2013.01); *H04B 7/0426* (2013.01); *H04B 17/26* (2015.01); *H04W 52/265* (2013.01)

(58) Field of Classification Search
CPC .. H04B 17/0085; H04B 7/0426; H04B 17/26; H04B 17/20; H04W 52/265
See application file for complete search history.

(56) References Cited

U.S. PATENT DOCUMENTS

2013/0027256 A1*  1/2013  Guo ............... H04W 24/06
                                                     343/703
2014/0092771 A1*  4/2014  Siomina ......... H04W 24/08
                                                     370/252
(Continued)

FOREIGN PATENT DOCUMENTS

CN    102130725 A    7/2011
CN    103986532 A    8/2014
(Continued)

OTHER PUBLICATIONS

Interpreting the Total Isotropic Sensitivity and Diversity Gain of LTE-Enabled Wireless Devices From Over-the-Air Throughput Measurements in Reverberation Chambers, Ahmed Hussain, Per-Simon Kildal, Andrés Alayon Glazunov, Chalmers University of Technology, Gothenburg, Sweden, IEEE Access, Mar. 23, 2015 (Year: 2015).*

(Continued)

*Primary Examiner* — Edan Orgad
*Assistant Examiner* — Malick A Sohrab
(74) *Attorney, Agent, or Firm* — Harrity & Harrity, LLP

(57) ABSTRACT

Various aspects of the present disclosure generally relate to wireless communication. In some aspects, a testing equipment may transmit a set of test signals to a device under test (DUT) from a plurality of directions relative to the DUT; obtain, from the DUT, a set of measured multiple-input multiple-output (MIMO) sensitivity results based at least in part on the set of test signals; and determine a MIMO over the air (OTA) performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile. Numerous other aspects are provided.

29 Claims, 8 Drawing Sheets

(51) Int. Cl.
H04B 17/26 (2015.01)
H04W 52/26 (2009.01)

(56) References Cited

U.S. PATENT DOCUMENTS

2014/0120947 A1* 5/2014 Siomina ................ H04W 64/00
                                                            455/456.1
2016/0212641 A1* 7/2016 Kong ................. H04B 17/0087
2016/0302079 A1* 10/2016 Chari .................... H04W 24/08
2018/0027434 A1* 1/2018 Foegelle ............. H04B 7/0617
                                                            455/67.13
2020/0213018 A1* 7/2020 Qi .......................... H04B 17/15
2022/0369405 A1* 11/2022 Lim ..................... H04B 17/336

FOREIGN PATENT DOCUMENTS

| CN | 107819530 A | 3/2018 |
| CN | 109617623 A | 4/2019 |
| EP | 2512173 A1 | 10/2012 |
| EP | 2533572 A1 | 12/2012 |
| WO | 2019092476 A1 | 5/2019 |

OTHER PUBLICATIONS

Supplementary European Search Report—EP20912865—Search Authority—The Hague—Sep. 7, 2023.
International Search Report and Written Opinion—PCT/CN2020/070406—ISAEPO—Sep. 28, 2020.

* cited by examiner

MULTIPLE-INPUT MULTIPLE-OUTPUT OVER THE AIR PERFORMANCE TESTING

CROSS-REFERENCE TO RELATED APPLICATION

This application is a 371 national stage of Patent Cooperation Treaty (PCT) Application No. PCT/CN2020/070406 filed on Jan. 6, 2020, entitled "MULTIPLE-INPUT MULTIPLE-OUTPUT OVER THE AIR PERFORMANCE TESTING," which is hereby expressly incorporated by reference herein.

FIELD OF THE DISCLOSURE

Aspects of the present disclosure generally relate to wireless communication and to techniques and apparatuses for multiple-input multiple-output (MIMO) over the air (OTA) performance testing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, MIMO antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a testing equipment, may include transmitting a set of test signals to a device under test (DUT) from a plurality of directions relative to the DUT; obtaining, from the DUT, a set of measured MIMO sensitivity results based at least in part on the set of test signals; and determining a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile.

In some aspects, a method of wireless communication, performed by a testing equipment, may include selecting a subset of directions relative to a DUT for testing a MIMO OTA performance of the DUT based at least in part on satisfaction of a spherical coverage parameter or a transmitting power map of the DUT; transmitting a set of test signals to the DUT from the subset of directions relative to the DUT; obtaining, from the DUT, a set of measured MIMO sensitivity results based at least in part on the set of test signals; and determining the MIMO OTA performance of the DUT based at least in part on the set of measured MIMO sensitivity results.

In some aspects, a testing equipment for wireless communication may include memory and one or more processors operatively coupled to the memory. The memory and the one or more processors may be configured to transmit a set of test signals to a DUT from a plurality of directions relative to the DUT; obtain, from the DUT, a set of measured MIMO sensitivity results based at least in part on the set of test signals; and determine a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile.

In some aspects, a testing equipment for wireless communication may include memory and one or more processors operatively coupled to the memory. The memory and the one or more processors may be configured to select a subset of directions relative to a DUT for testing a MIMO OTA performance of the DUT based at least in part on satisfaction of a spherical coverage parameter or a transmitting power map of the DUT; transmit a set of test signals to the DUT from the subset of directions relative to the DUT; obtain, from the DUT, a set of measured MIMO sensitivity results based at least in part on the set of test signals; and determine the MIMO OTA performance of the DUT based at least in part on the set of measured MIMO sensitivity results.

In some aspects, a non-transitory computer-readable medium may store one or more instructions for wireless communication. The one or more instructions, when executed by one or more processors of a testing equipment, may cause the one or more processors to: transmit a set of test signals to a DUT from a plurality of directions relative to the DUT; obtain, from the DUT, a set of measured MIMO sensitivity results based at least in part on the set of test signals; and determine a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile.

In some aspects, a non-transitory computer-readable medium may store one or more instructions for wireless communication. The one or more instructions, when executed by one or more processors of a testing equipment, may cause the one or more processors to: select a subset of directions relative to a DUT for testing a MIMO OTA performance of the DUT based at least in part on satisfaction of a spherical coverage parameter or a transmitting power map of the DUT; transmit a set of test signals to the DUT from the subset of directions relative to the DUT; obtain, from the DUT, a set of measured MIMO sensitivity results based at least in part on the set of test signals; and determine the MIMO OTA performance of the DUT based at least in part on the set of measured MIMO sensitivity results.

In some aspects, an apparatus for wireless communication may include means for transmitting a set of test signals to a DUT from a plurality of directions relative to the DUT; means for obtaining, from the DUT, a set of measured MIMO sensitivity results based at least in part on the set of test signals; and means for determining a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile.

In some aspects, an apparatus for wireless communication may include means for selecting a subset of directions relative to a DUT for testing a MIMO OTA performance of the DUT based at least in part on satisfaction of a spherical coverage parameter or a transmitting power map of the DUT; means for transmitting a set of test signals to the DUT from the subset of directions relative to the DUT; means for obtaining, from the DUT, a set of measured MIMO sensitivity results based at least in part on the set of test signals; and means for determining the MIMO OTA performance of the DUT based at least in part on the set of measured MIMO sensitivity results.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
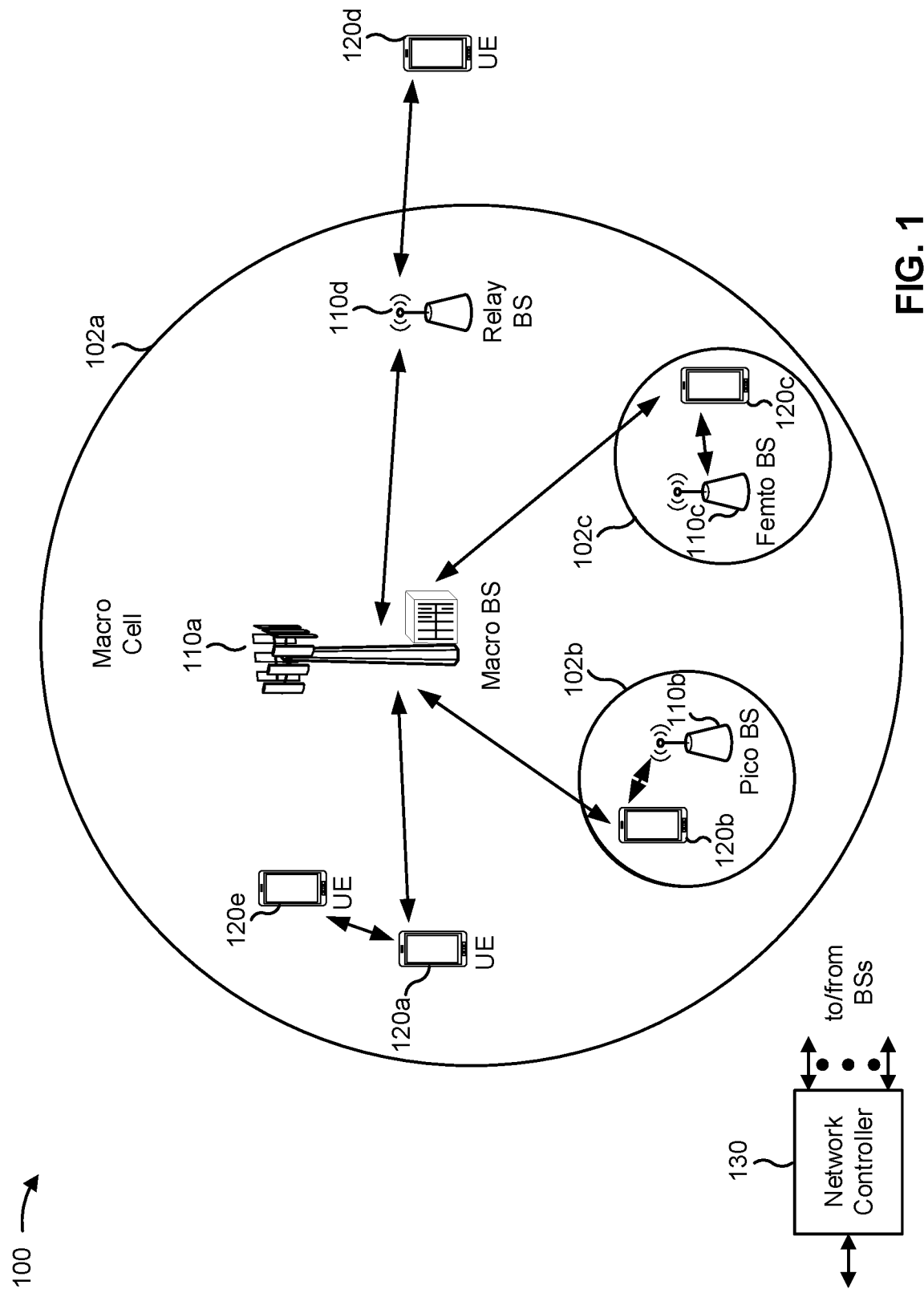
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
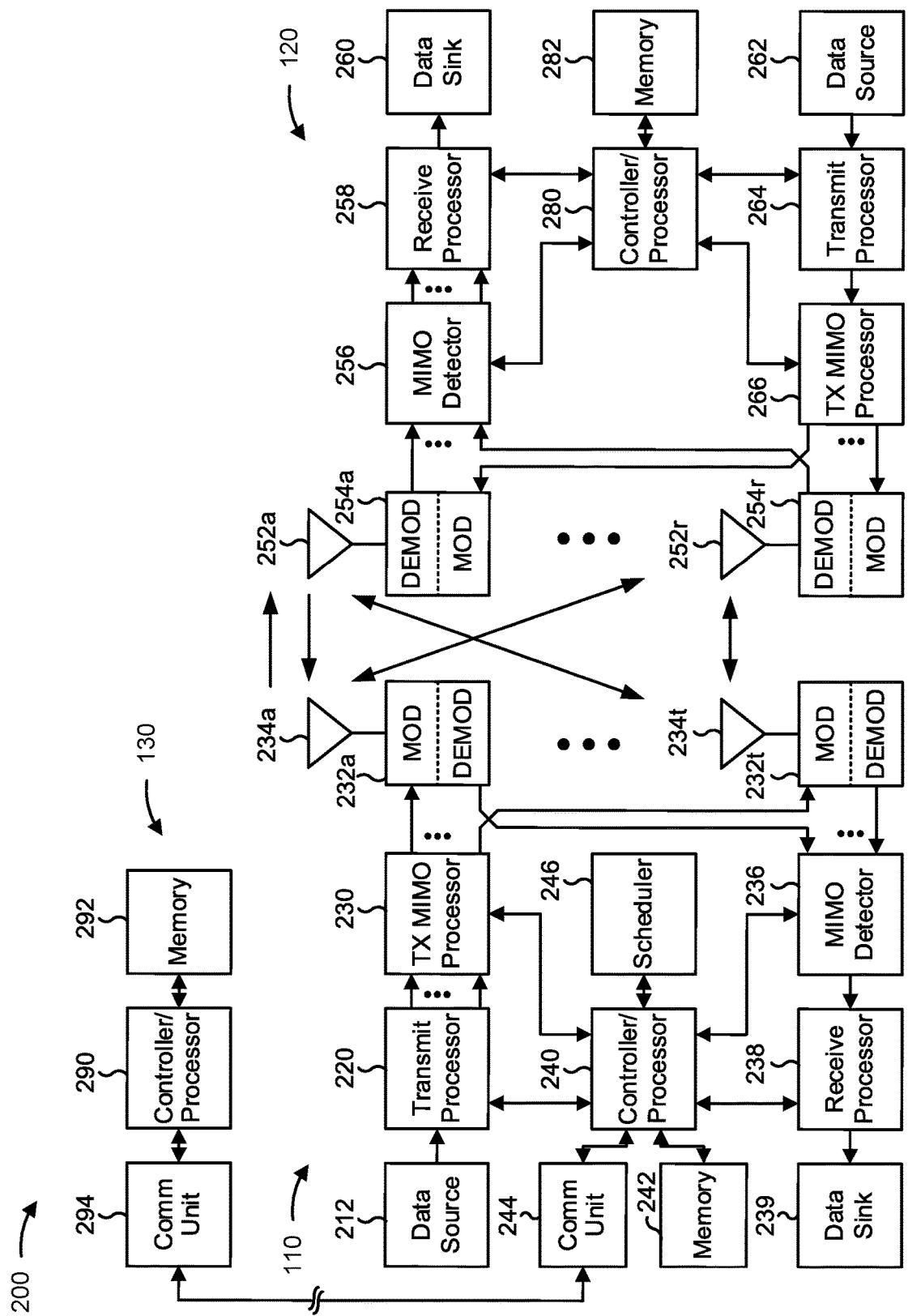
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) MIMO processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with MIMO OTA performance testing, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, a testing equipment (e.g., base station 110) may include means for transmitting a set of test signals to a DUT (e.g., UE 120) from a plurality of directions relative to the DUT; means for obtaining, from the DUT, a set of measured MIMO sensitivity results based at least in part on the set of test signals; means for determining a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile; and/or the like. In some aspects, such means may include one or more components of base station 110 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a testing equipment (e.g., base station 110) may include means for selecting a subset of directions relative to a DUT (e.g., UE 120) for testing a MIMO OTA performance of the DUT based at least in part on satisfaction of a spherical coverage parameter or a transmitting power map of the DUT; means for transmitting a set of test signals to the DUT from the subset of directions relative to the DUT; means for obtaining, from the DUT, a set of measured MIMO sensitivity results based at least in part on the set of test signals; means for determining the MIMO OTA performance of the DUT based at least in part on the set of measured MIMO sensitivity results; and/or the like. In some aspects, such means may include one or more components of base station 110 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Testing equipment may be used to test devices that are to be deployed in a wireless communication network. For example, testing equipment may be used to test MIMO OTA performance of a device under test (DUT) by transmitting test signals to the DUT, receiving measured MIMO sensitivity results, and determining the performance of the DUT based at least in part on all of the measured MIMO sensitivity results. A total radiated multi-antenna sensitivity (TRMS) may be used as a metric to identify the MIMO OTA performance.

In LTE MIMO OTA performance testing, the DUT may by positioned in three orientations (free space data mode portrait (FS DMP), free space data mode landscape (FS DML), and free space data mode screen up (FS DMSU)) when the testing equipment transmits the test signals to the DUT. The testing equipment may transmit test signals from each of 12 directions (at a horizon altitude with various azimuth angles) for each of the orientations. The testing equipment may use an average TRMS of the three orientations to determine the MIMO OTA performance of the DUT. Because LTE signals may be transmitted on a relatively low frequency band (e.g., relative to millimeter wave (mmWave) signals), using the average of the three orientations may be sufficient for LTE MIMO OTA performance testing.

For mmWave MIMO OTA performance testing, the three orientations used for LTE MIMO OTA performance testing may be ineffective to accurately test performance of the DUT. For example, a beam width of a mmWave beam is narrower than a beam width of a lower frequency signal, and measurements of test signals may have increased sensitivity to antenna performance, antenna module numbers, and antenna module placement.

In some aspects described herein, a testing equipment may transmit a set of test signals to a DUT from a plurality of directions relative to the DUT. For example, the plurality of directions may be based at least in part on various azimuth angles for transmitting test signals of the set of test signals. In some aspects, the plurality of directions may be based at least in part on generating a 3-dimensional scan of the DUT by transmitting test signals of the set of test signals with various azimuth angles and altitude angles. The testing equipment may obtain, from the DUT, a set of measured MIMO sensitivity results based at least in part on the set of test signals.

In some aspects, the testing equipment may determine the MIMO OTA performance of the DUT based at least in part on a single measured sensitivity result of the set of measured MIMO sensitivity results. The testing equipment may select the single measured sensitivity result based at least in part on the single measured sensitivity result being at a particular percentile of the set of single measured sensitivity results.

In some aspects, the testing equipment may determine the MIMO OTA performance of the DUT based at least in part on an average of measured sensitivity results, in a subset of the set of measured MIMO sensitivity results, that satisfy a threshold percentile. In other words, the average of measured MIMO sensitivity results may include an average of the subset that includes measured MIMO sensitivity results within a highest percentile (e.g., above (or at or above) the threshold percentile), within a percentile range (e.g., above (or at or above) a first percentile and below (or at or below) a second percentile), or within a lowest percentile (e.g., below (or at or below) the threshold percentile) of measured MIMO sensitivity results.

For example, the testing equipment may use an average of a linear scale of measured MIMO sensitivity results in a subset based at least in part on the measured MIMO sensitivity results in the subset being above (or being at or above) a $50^{th}$ percentile.

In some aspects described herein, a testing equipment may select a subset of directions relative to the DUT for testing the MIMO OTA performance of the DUT. The testing equipment may select the subset of directions to use for testing based at least in part on satisfaction of a spherical coverage parameter or a transmitting power map of the DUT. The testing equipment may transmit a set of test signals to the DUT from the subset of directions relative to the DUT. The testing equipment may obtain, from the DUT, a set of measured MIMO sensitivity results based at least in part on the set of test signals. The testing equipment may determine the MIMO OTA performance of the DUT based at least in part on the set of measured MIMO sensitivity results (e.g., the full set, a single measured MIMO sensitivity result of the set, a subset of the set, and/or the like).

In this way, the testing equipment may test MIMO OTA performance of the DUT with improved accuracy relative to existing methods of MIMO OTA performance testing. Additionally, the testing equipment may test MIMO OTA performance of a DUT for mmWave signals with improved accuracy.

Figure 3:
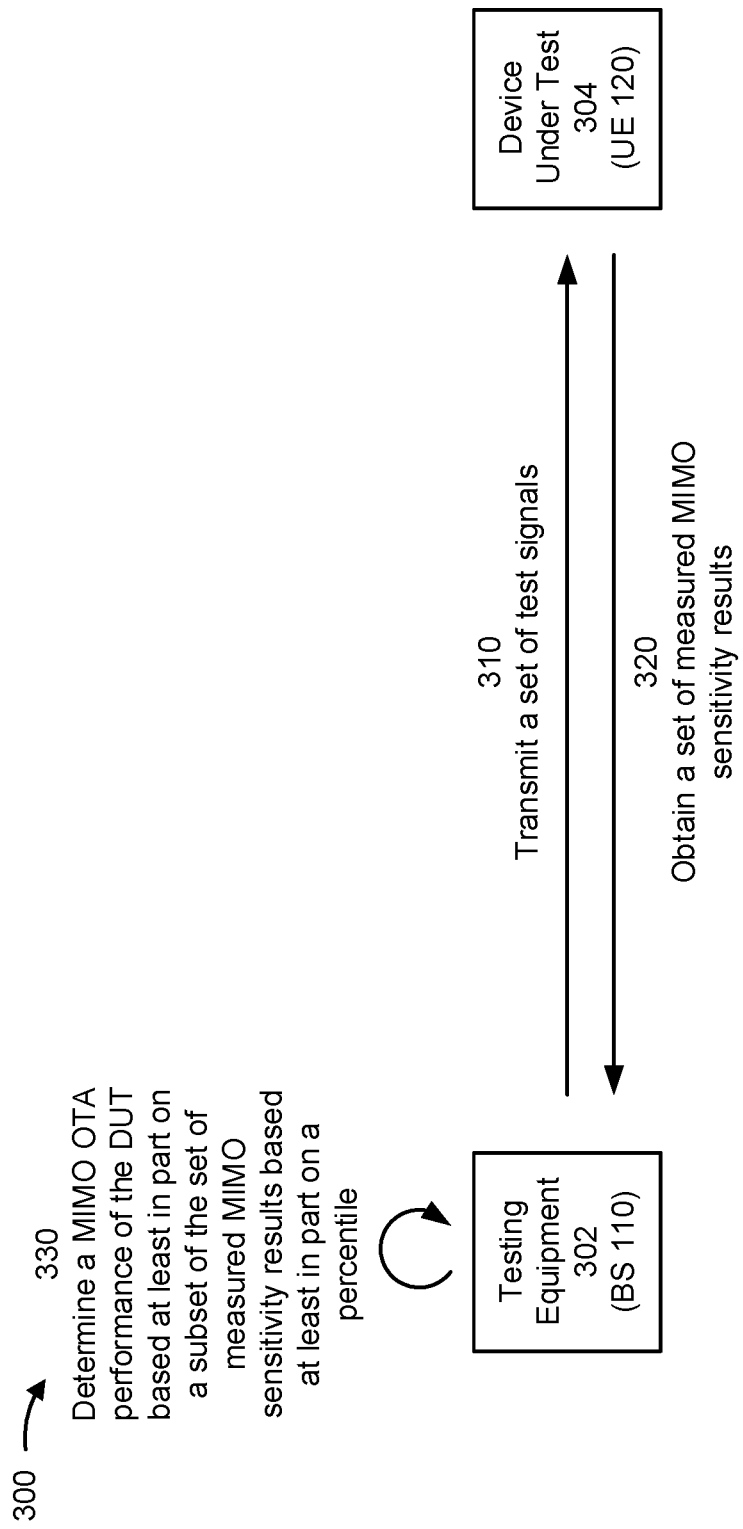
FIG. 3 is a diagram illustrating an example of MIMO OTA performance testing, in accordance with various aspects of the present disclosure.

FIG. 3 is a diagram illustrating an example 300 of MIMO OTA performance testing, in accordance with various aspects of the present disclosure. As shown in FIG. 3, example 300 may include a testing equipment 302 (e.g., a base station 110) and a DUT 304 (e.g., a UE 120 that may be tested). In some aspects, testing equipment 302 may include one or more base station simulators, one or more channel mode emulators, one or more amplifiers, and/or the like to provide MIMO OTA performance testing for DUT 304. Testing equipment 302 and DUT 304 may establish a connection to facilitate testing.

As shown by reference number 310, testing equipment 302 may transmit a set of test signals to DUT 304 from a plurality of directions relative to DUT 304. For example, testing equipment 302 may transmit the set of test signals to DUT 304 from various azimuth angles and/or from various altitude angles relative to DUT 304. DUT 304 may measure MIMO sensitivity results based at least in part on the set of test signals. In some aspects, the measured MIMO sensitivity results may indicate a throughput of signals of the set of test signals.

As shown by reference number 320, testing equipment 302 may obtain a set of measured MIMO sensitivity results based at least in part on the set of test signals. For example, testing equipment 302 may receive an indication of measured MIMO sensitivity results corresponding to respective signals of the set of test signals.

As shown by reference number 330, testing equipment 302 may determine a MIMO OTA performance of DUT 304 based at least in part on a subset of the set of measured MIMO sensitivity results based at least in part on a percentile.

In some aspects, testing equipment 302 may determine the MIMO OTA performance of DUT 304 based at least in part on a single measured MIMO sensitivity result of the set of measured MIMO sensitivity results. In some aspects, testing equipment 302 may select the single measured MIMO sensitivity result based at least in part on the single measured MIMO sensitivity result being at a particular percentile of the set of measured MIMO sensitivity results. For example, the single measured MIMO sensitivity result may be a measured MIMO sensitivity result at a $50^{th}$ percentile of the set of measured MIMO sensitivity results. In some aspects, testing equipment 302 may select the percentile based at least in part on a power class of DUT 304.

In some aspects, testing equipment 302 may determine whether DUT 304 satisfies a MIMO OTA performance parameter based at least in part on whether the single measured MIMO sensitivity result satisfies a threshold MIMO sensitivity for the MIMO OTA performance parameter.

In some aspects, the testing equipment may determine the MIMO OTA performance of DUT 304 based at least in part on an average of MIMO sensitivity results, in a subset of the set of measured MIMO sensitivity results, that satisfy a threshold percentile. In some aspects, the average may be an average of a linear scale of measured MIMO sensitivity results in the subset. In some aspects, the average of the linear scale of measured MIMO sensitivity results in the subset may be calculated based at least in part on:

$$S_X = 10 \log \left[ \frac{K}{\sum_{i=1}^{K} \frac{1}{\frac{P_i}{10^{10}}}} \right], \quad \text{(Equation 1)}$$

where P_i is a measured MIMO sensitivity result at an i-th test point, K is based at least in part on the threshold percentile such that only measured MIMO sensitivity results that satisfy the threshold percentile (having a quantity of K) may be used to calculate the average of the linear scale of measured MIMO sensitivity results. In this way, the average of the linear scale of measured MIMO sensitivity results may be based at least in part on measured MIMO sensitivity results of a subset of K MIMO sensitivity results that satisfy the threshold percentile. In other words, the average linear scale may be based on measured MIMO sensitivity results within a highest percentile, within a percentile range, or within a lowest percentile of measured MIMO sensitivity results. Testing equipment 302 may select the threshold percentile based at least in part on a power class of DUT 304 (e.g., $50^{th}$ percentile for power class 3).

In some aspects, the testing equipment may determine whether DUT 304 satisfies a MIMO OTA performance parameter based at least in part on whether the average of the MIMO sensitivity results satisfies a threshold MIMO sensitivity for the MIMO OTA performance parameter.

Figure 4:
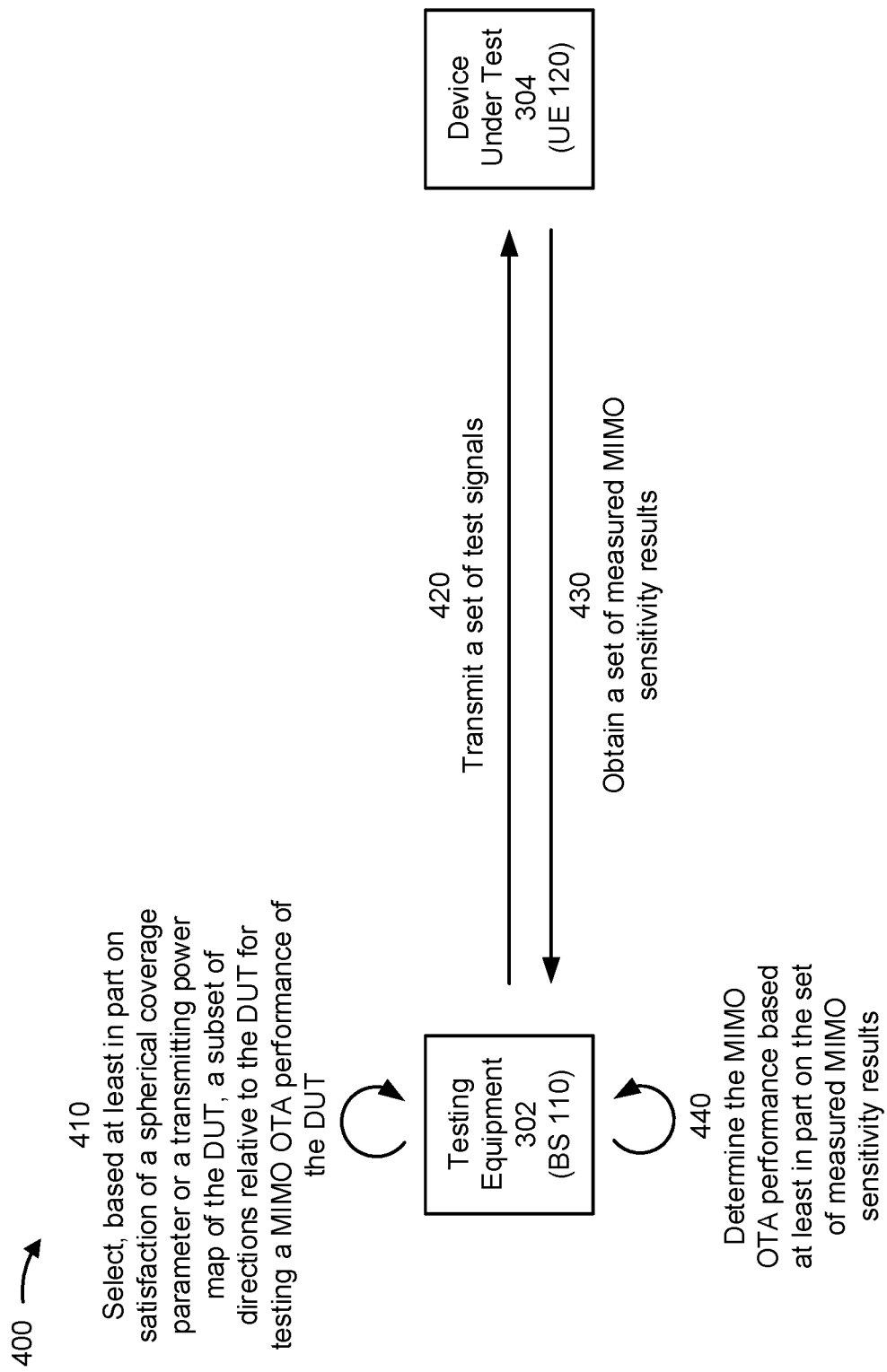
FIG. 4 is a diagram illustrating an example of MIMO OTA performance testing, in accordance with various aspects of the present disclosure.
Figure 5A:
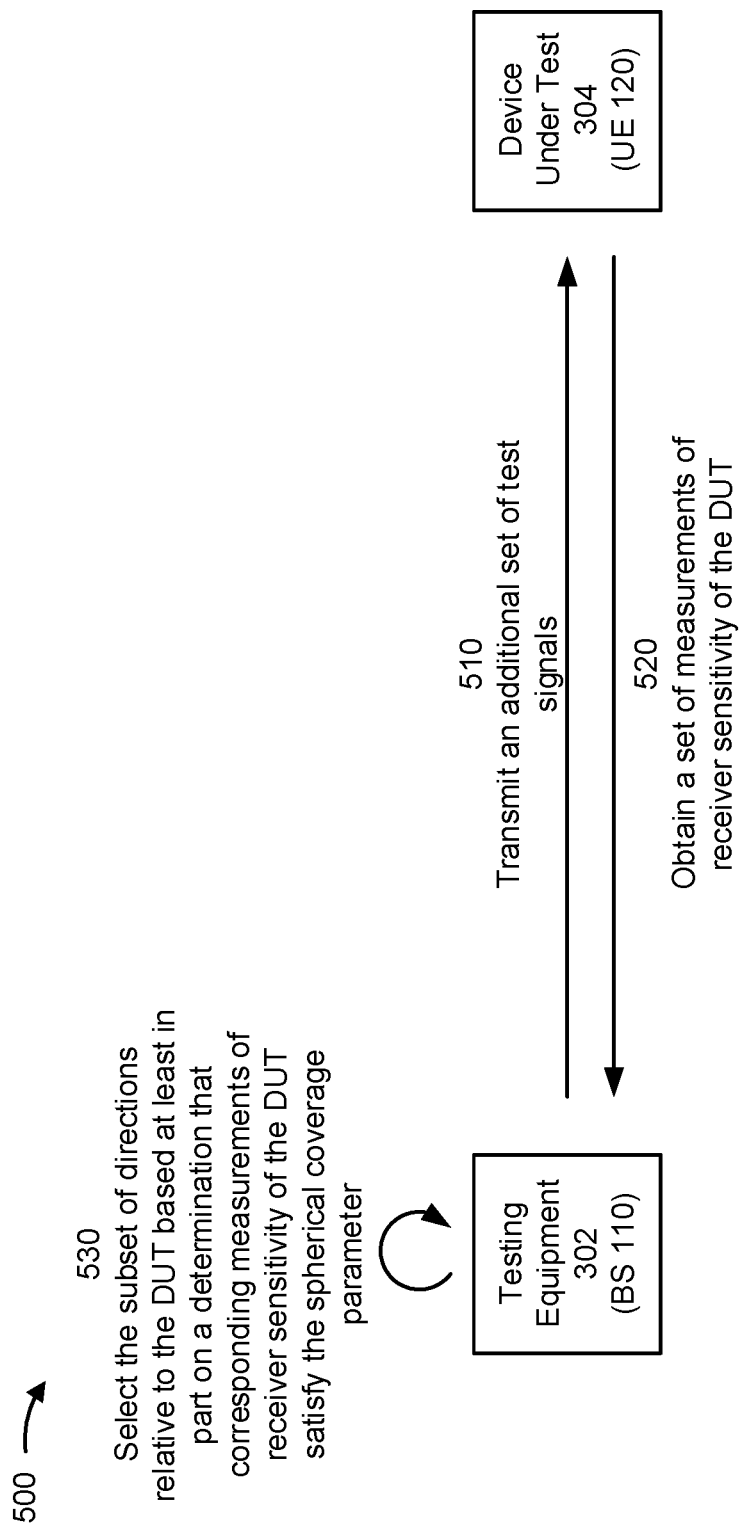
FIGS. 5A and 5B are diagrams illustrating examples of selecting a subset of directions relative to a DUT for testing a MIMO OTA performance of the DUT, in accordance with various aspects of the present disclosure.
Figure 5B:
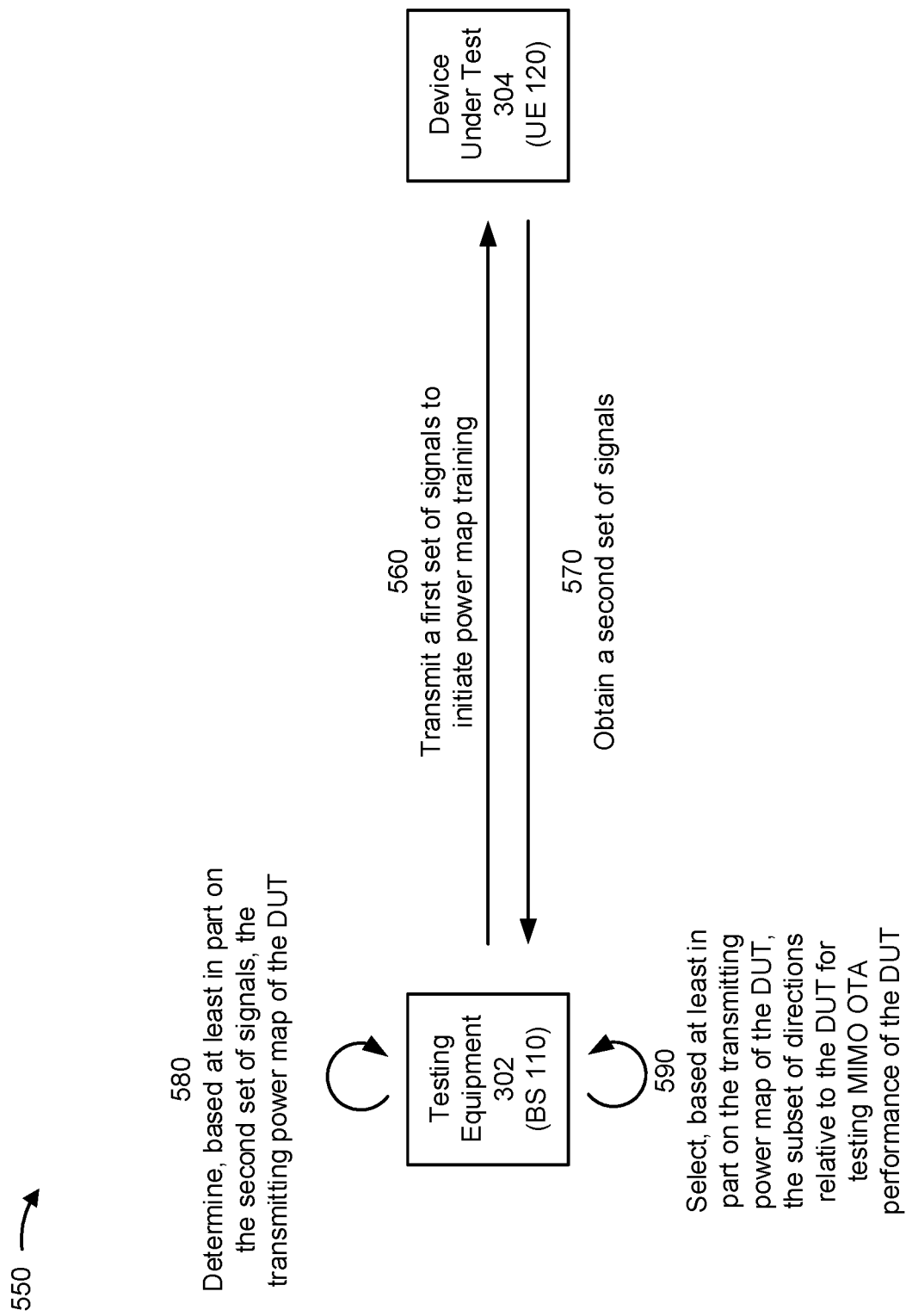

In some aspects, the testing equipment may select the plurality of directions relative to DUT 304 based at least in part on satisfaction of a spherical coverage parameter, a transmitting power map of DUT 304, and/or the like, as discussed in relation to FIGS. 4-5B.

As indicated above, FIG. 3 is provided as an example. Other examples may differ from what is described with respect to FIG. 3.

FIG. 4 is a diagram illustrating an example 400 of MIMO OTA performance testing, in accordance with various aspects of the present disclosure. As shown in FIG. 4, example 400 may include a testing equipment 302 (e.g., a base station 110) and a DUT 304 (e.g., a UE 120 that may be tested). In some aspects, testing equipment 302 may include one or more base station simulators, one or more channel mode emulators, one or more amplifiers, and/or the like to provide MIMO OTA performance testing for DUT 304. Testing equipment 302 and DUT 304 may establish a connection to facilitate testing.

As shown by reference number 410, testing equipment 302 may select, based at least in part on satisfaction of a spherical coverage parameter or a transmitting power map of DUT 304, a subset of directions relative to DUT 304 for testing a MIMO OTA performance of DUT 304, as will be described in more detail in relation to FIGS. 5A and 5B. In some aspects, the subset of directions may be from various azimuth angles and/or from various altitude angles relative to DUT 304.

As shown by reference number 420, testing equipment 302 may transmit a set of test signals to DUT 304 from the subset of directions relative to DUT 304. DUT 304 may measure MIMO sensitivity results based at least in part on the set of test signals. In some aspects, the measured MIMO sensitivity results may indicate a throughput of signals of the set of test signals.

As shown by reference number 430, testing equipment 302 may obtain a set of measured MIMO sensitivity results from DUT 304. For example, testing equipment 302 may receive an indication of measured MIMO sensitivity results corresponding to respective signals of the set of test signals (e.g. associated with the subset of directions).

As shown by reference number 440, testing equipment 302 may determine the MIMO OTA performance based at least in part on the set of measured MIMO sensitivity results.

In some aspects, testing equipment 302 may determine whether DUT 304 satisfies a MIMO OTA performance parameter based at least in part on whether an average of measured MIMO sensitivity results of the set of measured MIMO sensitivity results satisfies a threshold MIMO sensitivity for the MIMO OTA performance parameter. In some aspects, the average may be based at least in part on an average of a linear scale of measured MIMO sensitivity results.

In some aspects, testing equipment 302 may determine the performance of DUT 304 based at least in part on an average of measured MIMO sensitivity results, in a subset of the set of measured MIMO sensitivity results that satisfy a threshold percentile (e.g., as discussed in relation to FIG. 3), satisfies a threshold MIMO sensitivity for the MIMO OTA performance parameter. In some aspects, the average may be based at least in part on an average of a linear scale of measured MIMO sensitivity results.

In some aspects, testing equipment 302 may determine whether DUT 304 satisfies a MIMO OTA performance parameter based at least in part on whether a measured MIMO sensitivity result at a particular percentile (e.g., as discussed in relation to FIG. 3) of the set of measured MIMO sensitivity results satisfies a threshold MIMO sensitivity for the MIMO OTA performance parameter. In some aspects, testing equipment 302 may select the particular percentile based at least in part on a power class of DUT 304.

As indicated above, FIG. 4 is provided as an example. Other examples may differ from what is described with respect to FIG. 4.

FIGS. 5A-5B are diagrams illustrating examples 500 and 550, respectively, of selecting a subset of directions relative to DUT 304 for testing a MIMO OTA performance of DUT 304, in accordance with various aspects of the present disclosure. The examples 500 and 550 may be examples for selecting the subset of directions relative to DUT 304 for testing a MIMO OTA performance of DUT 304 based at least in part on satisfaction of a spherical coverage parameter or a transmitting power map of DUT 304. For example, one or both of examples 500 or 550 may be performed before, or as part of, the selecting operation shown by reference number 410 in FIG. 4.

As shown in FIG. 5A, and by reference number 510, testing equipment 302 transmits an additional set of test signals to DUT 304. Testing equipment 302 may transmit the additional set of test signals to DUT 304 from a set of directions relative to DUT 304 (e.g., that comprise the subset of directions relative to DUT 304). Testing equipment 302 may transmit the additional set of test signals according to an effective isotropic sensitivity (EIS) parameter on a measurement grid. For example, testing equipment 302 may transmit the additional set of test signals with a downlink power based at least in part on the EIS parameter. DUT 304 may measure receiver sensitivity of DUT 304 based at least in part on the additional set of test signals.

As shown by reference number 520, testing equipment 302 may obtain a set of measurements of receiver sensitivity of DUT 304 from DUT 304. The set of measurements of receiver sensitivity of DUT 304 may indicate receiver sensitivities of DUT 304 corresponding to respective signals of the additional set of test signals (e.g., associated with the set of directions).

As shown by reference number 530, testing equipment 302 may select the subset of directions relative to DUT 304 based at least in part on a determination that corresponding measurements of receiver sensitivity of the DUT 304 satisfy the spherical coverage parameter. In some aspects, if DUT 304 satisfies an EIS spherical coverage parameter for a particular direction relative to DUT 304, testing equipment 302 switches to MIMO sensitivity testing for that particular direction and transmits a signal of the set of test signals. In some aspects, if DUT 304 does not satisfy the EIS spherical coverage parameter for the particular direction relative to DUT 304, testing equipment 302 skips MIMO sensitivity testing for that particular direction.

Testing equipment 302 may determine the MIMO OTA performance based at least in part on an average of the set of measured MIMO sensitivity results (e.g., based at least in part on measurements from the set of test signals transmitted in directions corresponding to directions where DUT 304 satisfies the EIS spherical coverage parameter). In some aspects, the average of the linear scale of measured MIMO sensitivity results in the set of measured MIMO sensitivity results may be calculated based at least in part on:

$$S_X = 10 \log \left[ \frac{l}{\sum_{i=1}^{l} \frac{1}{10^{\frac{P_i}{10}}}} \right], \quad \text{(Equation 2)}$$

where P_i is a measured MIMO sensitivity result at an i-th test point, and l is based at least in part on a quantity of directions for which DUT 304 satisfies the EIS spherical coverage parameter.

In some aspects, testing equipment 302 may determine the MIMO OTA performance based at least in part on a single measured MIMO sensitivity result of the set of measured MIMO sensitivity results (e.g., as described in relation to FIG. 3). For example, testing equipment 302 may select the single measured MIMO sensitivity result based at least in part on the single measured MIMO sensitivity result being at a particular percentile of the set of measured MIMO sensitivity results. Testing equipment 302 may determine whether DUT 304 satisfies a MIMO OTA performance parameter based at least in part on whether the single measured MIMO sensitivity result satisfies a threshold MIMO sensitivity for the MIMO OTA performance parameter.

As shown in FIG. 5B, and by reference number 560, testing equipment 302 may transmit a first set of signals, from a set of directions relative to DUT 304, to DUT 304 to initiate power map training. In some aspects, testing equipment 302 may transmit a training codebook (e.g., codebook indexes), that defines a training direction range and process, to DUT 304. In some aspects, testing equipment 302 may select the set of directions to match transmitting directions of DUT 304 (e.g., using probes).

As shown by reference number 570, testing equipment 302 may obtain a second set of signals from DUT 304. In some aspects, DUT 304 may transmit the second set of signals with a transmit power based at least in part on an indication from testing equipment 302 (e.g., indicating a maximum transmit power).

As shown by reference number 580, testing equipment 302 may determine, based at least in part on the second set of signals, the transmitting power map of DUT 304. In some aspects, testing equipment 302 may measure transmitting powers of signals of the second set of signals to determine the transmitting power map of DUT 304 (e.g., a map indicating power of transmitted signals for various azimuth angles and/or altitude angles).

As shown by reference number 590, testing equipment 302 may select, based at least in part on the transmitting power map of DUT 304, the subset of directions relative to DUT 304 for testing MIMO OTA performance of DUT 304.

In some aspects, the subset of directions relative to DUT 304 for testing MIMO OTA performance of DUT 304 may comprise only a single direction. Testing equipment 302 may select the single direction relative to DUT 304 based at least in part on the single direction corresponding to a direction of a signal of the second set of signals having a transmitting power at a particular percentile of transmitting powers of the second set of signals. Testing equipment 302 may select the particular percentile of transmitting powers based at least in part on a power class of DUT 304.

In some aspects, testing equipment 302 may select a plurality of directions relative to DUT 304 based at least in part on the plurality of directions corresponding to directions of a subset of the second set of signals. In some aspects, testing equipment 302 may select the subset of the second set of signals based at least in part on the subset of the second set of signals having transmitting powers that satisfy a threshold percentile of transmitting powers of the second set of signals. For example, testing equipment 302 may select the subset based in part on the subset corresponding to directions of signals of the second set of signals having transmitting powers at or above the threshold percentile (e.g., 50$^{th}$ percentile). In some aspects, testing equipment 302 may select the threshold percentile of transmitting powers based at least in part on a power class of DUT 304.

Testing equipment 302 may determine the MIMO OTA performance based at least in part on an average of the set of measured MIMO sensitivity results (e.g., based at least in part on measurements from the set of test signals transmitted in directions corresponding to directions corresponding to a particular percentile or satisfying a threshold percentile of transmitting power). In some aspects, the average of the linear scale of measured MIMO sensitivity results in the set of measured MIMO sensitivity results may be calculated based at least in part on:

$$S_X = 10 \log \left[ \frac{J}{\sum_{i=1}^{J} \frac{1}{P_i}} \right], \quad \text{(Equation 3)}$$

where P_i is a measured MIMO sensitivity result at an i-th test point, J is based at least in part on the threshold percentile such that only measured MIMO sensitivity results corresponding to directions of signals of the second set of signals having transmitting powers that are above (or at or above) the threshold percentile (having a quantity J) may be used to calculate the average of the linear scale of measured MIMO sensitivity results. Testing equipment 302 may select the threshold percentile based at least in part on a power class of DUT 304.

In some aspects, because of beam correspondence, uplink signals and downlink signals may have a similar beam pattern. By using transmitting power measurements, testing equipment 302 may be able to relatively quickly (e.g., compared with using MIMO sensitivity testing for all directions in the set of directions) select the subset of directions for testing MIMO OTA performance.

As indicated above, FIGS. 5A and 5B are provided as examples. Other examples may differ from what is described with respect to FIGS. 5A and 5B.

Figure 6:
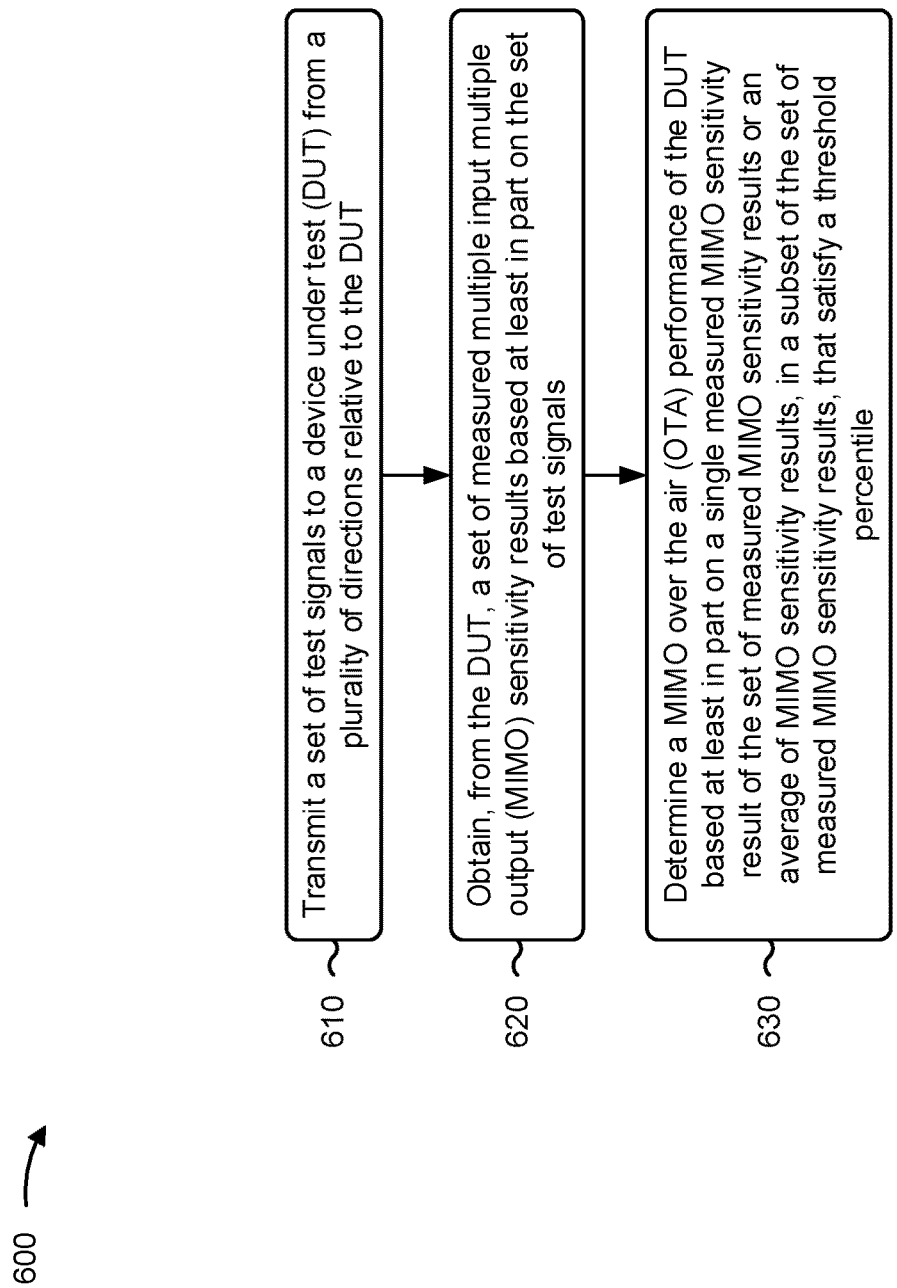
FIG. 6 is a diagram illustrating an example process performed, for example, by a testing equipment, in accordance with various aspects of the present disclosure.

FIG. 6 is a diagram illustrating an example process 600 performed, for example, by a testing equipment, in accordance with various aspects of the present disclosure. Example process 600 is an example where the testing equipment (e.g., base station 110 and/or the like) performs operations associated with MIMO over the air performance testing of a DUT (e.g., a UE 120).

As shown in FIG. 6, in some aspects, process 600 may include transmitting a set of test signals to a DUT from a plurality of directions relative to the DUT (block 610). For example, the testing equipment (e.g., using receive processor 258, transmit processor 264, controller/processor 280, memory 282, and/or the like) may transmit a set of test signals to a DUT from a plurality of directions relative to the DUT, as described above.

As further shown in FIG. 6, in some aspects, process 600 may include obtaining, from the DUT, a set of measured MIMO sensitivity results based at least in part on the set of test signals (block 620). For example, the testing equipment (e.g., using receive processor 258, transmit processor 264, controller/processor 280, memory 282, and/or the like) may obtain, from the DUT, a set of measured MIMO sensitivity results based at least in part on the set of test signals, as described above.

As further shown in FIG. 6, in some aspects, process 600 may include determining a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile (block 630). For example, the testing equipment (e.g., using receive processor 258, transmit processor 264, controller/processor 280, memory 282, and/or the like) may determine a MIMO OTA performance of the DUT based at least in part on a single measured MIMO sensitivity result of the set of measured MIMO sensitivity results or an average of MIMO sensitivity results, in a subset of the set of measured MIMO sensitivity results, that satisfy a threshold percentile, as described above.

Process 600 may include additional aspects, such as any single aspect or any combination of aspects described below and/or in connection with one or more other processes described elsewhere herein.

In a first aspect, the MIMO OTA performance of the DUT is determined based at least in part on the single measured MIMO sensitivity result and process 600 includes selecting the single measured MIMO sensitivity result based at least in part on the single measured MIMO sensitivity result being at a particular percentile of the set of measured MIMO sensitivity results.

In a second aspect, alone or in combination with the first aspect, process 600 includes selecting the particular percentile of the set of measured MIMO sensitivity results based at least in part on a power class of the DUT.

In a third aspect, alone or in combination with one or more of the first and second aspects, determining the MIMO OTA performance of the DUT comprises: determining whether the DUT satisfies a MIMO OTA performance parameter based at least in part on whether the single measured MIMO sensitivity result satisfies a threshold MIMO sensitivity for the MIMO OTA performance parameter.

In a fourth aspect, alone or in combination with one or more of the first through third aspects, determining the MIMO OTA performance of the DUT comprises: determining whether the DUT satisfies a MIMO OTA performance parameter based at least in part on whether the average of the MIMO sensitivity results satisfies a threshold MIMO sensitivity for the MIMO OTA performance parameter.

In a fifth aspect, alone or in combination with one or more of the first through fourth aspects, process 600 includes selecting the threshold percentile based at least in part on a power class of the DUT.

In a sixth aspect, alone or in combination with one or more of the first through fifth aspects, the average of the measured MIMO sensitivity results is based at least in part on an average of a linear scale of the measured MIMO sensitivity results.

In a seventh aspect, alone or in combination with one or more of the first through sixth aspects, process 600 includes selecting the plurality of directions relative to the DUT based at least in part on satisfaction of a spherical coverage parameter.

In an eighth aspect, alone or in combination with one or more of the first through seventh aspects, selecting the plurality of directions relative to the DUT comprises: transmitting an additional set of test signals from a set of directions relative to the DUT; obtaining, from the DUT, a set of measurements of receiver sensitivity of the DUT for the set of directions based at least in part on the additional set of test signals; and selecting the plurality of directions relative to the DUT based at least in part on a determination that corresponding measurements of receiver sensitivity of the DUT satisfy the spherical coverage parameter.

In a ninth aspect, alone or in combination with one or more of the first through eighth aspects, process 600 includes selecting the plurality of directions relative to the DUT based at least in part on a transmitting power map of the DUT.

In a tenth aspect, alone or in combination with one or more of the first through ninth aspects, selecting the plurality of directions relative to the DUT: transmitting, to the DUT, a first set of signals to initiate transmitting power map training for the DUT; receiving, from the DUT, a second set of signals; determining, based at least in part on the second set of signals, the transmitting power map of the DUT; and selecting, based at least in part on the transmitting power map of the DUT, the plurality of directions relative to the DUT for testing MIMO OTA performance of the DUT.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
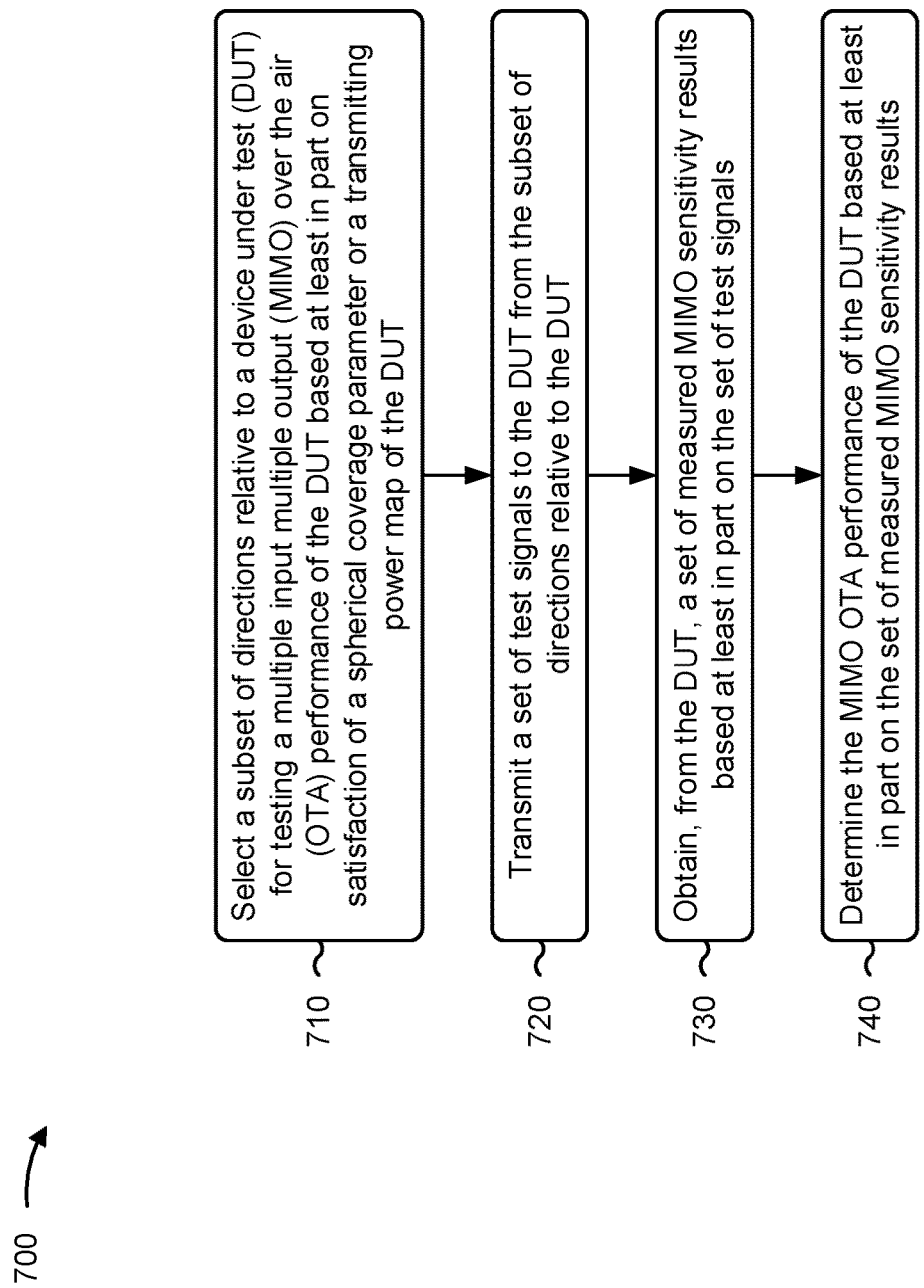
FIG. 7 is a diagram illustrating an example process performed, for example, by a testing equipment, in accordance with various aspects of the present disclosure.

FIG. 7 is a diagram illustrating an example process 700 performed, for example, by a testing equipment, in accordance with various aspects of the present disclosure. Example process 700 is an example where the testing equipment (e.g., base station 110 and/or the like) performs operations associated with MIMO over the air performance testing of a DUT (e.g., UE 120).

As shown in FIG. 7, in some aspects, process 700 may include selecting a subset of directions relative to a DUT for testing a MIMO OTA performance of the DUT based at least in part on satisfaction of a spherical coverage parameter or a transmitting power map of the DUT (block 710). For example, the testing equipment (e.g., using receive processor 258, transmit processor 264, controller/processor 280, memory 282, and/or the like) may select a subset of directions relative to a DUT for testing a MIMO OTA performance of the DUT based at least in part on satisfaction of a spherical coverage parameter or a transmitting power map of the DUT, as described above.

As further shown in FIG. 7, in some aspects, process 700 may include transmitting a set of test signals to the DUT from the subset of directions relative to the DUT (block 720). For example, the testing equipment (e.g., using receive processor 258, transmit processor 264, controller/processor 280, memory 282, and/or the like) may transmit a set of test signals to the DUT from the subset of directions relative to the DUT, as described above.

As further shown in FIG. 7, in some aspects, process 700 may include obtaining, from the DUT, a set of measured MIMO sensitivity results based at least in part on the set of test signals (block 730). For example, the testing equipment (e.g., using receive processor 258, transmit processor 264, controller/processor 280, memory 282, and/or the like) may obtain, from the DUT, a set of measured MIMO sensitivity results based at least in part on the set of test signals, as described above.

As further shown in FIG. 7, in some aspects, process 700 may include determining the MIMO OTA performance of the DUT based at least in part on the set of measured MIMO sensitivity results (block 740). For example, the testing equipment (e.g., using receive processor 258, transmit processor 264, controller/processor 280, memory 282, and/or the like) may determine the MIMO OTA performance of the DUT based at least in part on the set of measured MIMO sensitivity results, as described above.

Process 700 may include additional aspects, such as any single aspect or any combination of aspects described below and/or in connection with one or more other processes described elsewhere herein.

In a first aspect, determining the MIMO OTA performance of the DUT comprises: determining whether the DUT satisfies a MIMO OTA performance parameter based at least in part on whether an average of measured MIMO sensitivity results of the set of measured MIMO sensitivity results satisfies a threshold MIMO sensitivity for the MIMO OTA performance parameter.

In a second aspect, alone or in combination with the first aspect, determining the MIMO OTA performance of the DUT further comprises: determining whether the DUT satisfies a MIMO OTA performance parameter based at least in part on whether a measured MIMO sensitivity result at a particular percentile of the set of measured MIMO sensitivity results satisfies a threshold MIMO sensitivity for the MIMO OTA performance parameter.

In a third aspect, alone or in combination with one or more of the first and second aspects, selecting the subset of directions relative to the DUT comprises: transmitting an additional set test signals from a set of directions relative to the DUT; obtaining, from the DUT, a set of measurements of receiver sensitivity of the DUT for the set of directions based at least in part on the additional set of test signals; and selecting the subset of directions relative to the DUT based at least in part on a determination that corresponding measurements of receiver sensitivity of the DUT satisfy the spherical coverage parameter.

In a fourth aspect, alone or in combination with one or more of the first through third aspects, selecting the subset of directions relative to the DUT comprises: transmitting, to the DUT, a first set of signals to initiate transmitting power map training for the DUT; receiving, from the DUT, a second set of signals; determining, based at least in part on the second set of signals, the transmitting power map of the DUT; and selecting, based at least in part on the transmitting power map of the DUT, the subset of directions relative to the DUT for testing MIMO OTA performance of the DUT.

In a fifth aspect, alone or in combination with one or more of the first through fourth aspects, process 700 includes transmitting, to the DUT, a training codebook that defines a training direction range and process, wherein the second is setting of signals is based at least in part on the training codebook.

In a sixth aspect, alone or in combination with one or more of the first through fifth aspects, selecting the subset of directions relative to the DUT comprises: selecting a single direction relative to the DUT based at least in part on the single direction corresponding to a direction of a signal of the second set of signals having a transmitting power at a particular percentile of transmitting powers of the second set of signals.

In a seventh aspect, alone or in combination with one or more of the first through sixth aspects, process 700 includes selecting the particular percentile of transmitting powers of the second set of signals based at least in part on a power class of the DUT.

In an eighth aspect, alone or in combination with one or more of the first through seventh aspects, selecting the subset of directions relative to the DUT comprises: selecting a plurality of directions relative to the DUT based at least in part on the plurality of directions corresponding to directions of a subset of the second set of signals.

In a ninth aspect, alone or in combination with one or more of the first through eighth aspects, process 700 includes selecting the subset of the second set of signals based at least in part on the subset of the second set of signals having transmitting powers that satisfy a threshold percentile of transmitting powers of the second set of signals.

In a tenth aspect, alone or in combination with one or more of the first through ninth aspects, process 700 includes selecting the threshold percentile of transmitting powers of the second set of signals based at least in part on a power class of the DUT.

In an eleventh aspect, alone or in combination with one or more of the first through tenth aspects, process 700 includes determining the MIMO OTA performance of the DUT based at least in part on an average of MIMO sensitivity results, in a subset of the set of measured MIMO sensitivity results, that satisfy a threshold percentile.

In a twelfth aspect, alone or in combination with one or more of the first through eleventh aspects, process 700 includes selecting the threshold percentile based at least in part on a power class of the DUT.

In a thirteenth aspect, alone or in combination with one or more of the first through twelfth aspects, the set of measured MIMO sensitivity results comprises a single measured MIMO sensitivity result selected based at least in part on the single measured MIMO sensitivity result being at a particular percentile of the set of measured MIMO sensitivity results.

In a fourteenth aspect, alone or in combination with one or more of the first through thirteenth aspects, process 700 includes selecting the particular percentile of the set of measured MIMO sensitivity results based at least in part on a power class of the DUT.

In a fifteenth aspect, alone or in combination with one or more of the first through fourteenth aspects, process 700 includes selecting the particular percentile based at least in part on a power class of the DUT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method performed by a testing equipment, comprising:
    transmitting a set of test signals to a device under test (DUT) from a plurality of directions relative to the DUT;
    obtaining, from the DUT, a set of measured multiple-input multiple-output (MIMO) sensitivity results based at least in part on the set of test signals; and
    determining a MIMO over the air (OTA) performance of the DUT based at least in part on an average of a linear scale of a subset of the set of measured MIMO sensitivity results, the subset selected based at least in part on a threshold percentile.

2. The method of claim 1, wherein determining the MIMO OTA performance of the DUT comprises:
    determining whether the DUT satisfies a MIMO OTA performance parameter based at least in part on whether the average of the MIMO sensitivity results satisfies a threshold MIMO sensitivity for the MIMO OTA performance parameter.

3. The method of claim 1, further comprising:
    selecting the threshold percentile based at least in part on a power class of the DUT.

4. The method of claim 1, further comprising:
    selecting the plurality of directions relative to the DUT based at least in part on satisfaction of a spherical coverage parameter.

5. The method of claim 4, wherein selecting the plurality of directions relative to the DUT comprises:
    transmitting an additional set of test signals from a set of directions relative to the DUT;

obtaining, from the DUT, a set of measurements of receiver sensitivity of the DUT for the set of directions based at least in part on the additional set of test signals; and selecting the plurality of directions relative to the DUT based at least in part on a determination that corresponding measurements of receiver sensitivity of the DUT satisfy the spherical coverage parameter.

6. The method of claim 1, further comprising:
selecting the plurality of directions relative to the DUT based at least in part on a transmitting power map of the DUT.

7. The method of claim 6, wherein selecting the plurality of directions relative to the DUT:
transmitting, to the DUT, a first set of signals to initiate transmitting power map training for the DUT;
receiving, from the DUT, a second set of signals;
determining, based at least in part on the second set of signals, the transmitting power map of the DUT; and
selecting, based at least in part on the transmitting power map of the DUT, the plurality of directions relative to the DUT for testing MIMO OTA performance of the DUT.

8. The method of claim 1, wherein the subset of the measured MIMO sensitivity results comprises K sensitivity results, and wherein the method further comprises:
computing the average according to:

$$S_X = 10\log\left[\frac{K}{\sum_{i=1}^{K} \frac{1}{10^{\frac{P_i}{10}}}}\right],$$

wherein $P_i$ is a measured MIMO sensitivity result in the subset.

9. A testing equipment for wireless communication, comprising:
one or more memories; and
one or more processors coupled to the one or more memories, the one or more processors configured to:
transmit a set of test signals to a device under test (DUT) from a plurality of directions relative to the DUT;
obtain, from the DUT, a set of measured multiple-input multiple-output (MIMO) sensitivity results based at least in part on the set of test signals; and
determine a MIMO over the air (OTA) performance of the DUT based at least in part on an average of a linear scale of a subset of the set of measured MIMO sensitivity results, the subset selected based at least in part on a threshold percentile.

10. The testing equipment of claim 9, wherein the one or more processors, to determine the MIMO OTA performance of the DUT, are configured to:
determine whether the DUT satisfies a MIMO OTA performance parameter based at least in part on whether the average of the MIMO sensitivity results satisfies a threshold MIMO sensitivity for the MIMO OTA performance parameter.

11. The testing equipment of claim 9, wherein the one or more processors are configured to:
select the threshold percentile based at least in part on a power class of the DUT.

12. The testing equipment of claim 9, wherein the one or more processors are configured to:

select the plurality of directions relative to the DUT based at least in part on satisfaction of a spherical coverage parameter.

13. The testing equipment of claim 12, wherein the one or more processors, to select the plurality of directions relative to the DUT, are configured to:
transmit an additional set of test signals from a set of directions relative to the DUT;
obtain, from the DUT, a set of measurements of receiver sensitivity of the DUT for the set of directions based at least in part on the additional set of test signals; and
select the plurality of directions relative to the DUT based at least in part on a determination that corresponding measurements of receiver sensitivity of the DUT satisfy the spherical coverage parameter.

14. The testing equipment of claim 9, wherein the one or more processors are configured to:
select the plurality of directions relative to the DUT based at least in part on a transmitting power map of the DUT.

15. The testing equipment of claim 14, wherein the one or more processors, to select the plurality of directions relative to the DUT, are configured to:
transmit, to the DUT, a first set of signals to initiate transmitting power map training for the DUT;
receive, from the DUT, a second set of signals;
determine, based at least in part on the second set of signals, the transmitting power map of the DUT; and
select, based at least in part on the transmitting power map of the DUT, the plurality of directions relative to the DUT for testing MIMO OTA performance of the DUT.

16. The testing equipment of claim 14, wherein the subset of the measured MIMO sensitivity results comprises K sensitivity results, and
wherein the one or more processors are configured to:
compute the average according to:

$$S_X = 10\log\left[\frac{K}{\sum_{i=1}^{K} \frac{1}{10^{\frac{P_i}{10}}}}\right],$$

wherein $P_i$ is a measured MIMO sensitivity result in the subset.

17. A non-transitory computer-readable medium storing a set of instructions for wireless communication, the set of instructions comprising:
one or more instructions that, when executed by one or more processors of a testing equipment, cause the testing equipment to:
transmit a set of test signals to a device under test (DUT) from a plurality of directions relative to the DUT;
obtain, from the DUT, a set of measured multiple-input multiple-output (MIMO) sensitivity results based at least in part on the set of test signals; and
determine a MIMO over the air (OTA) performance of the DUT based at least in part on an average of a linear scale of a subset of the set of measured MIMO sensitivity results, the subset selected based at least in part on a threshold percentile.

18. The non-transitory computer-readable medium of claim 17, wherein the one or more instructions, when executed by the one or more processors to determine the MIMO OTA performance of the DUT, cause the testing equipment to:

determine whether the DUT satisfies a MIMO OTA performance parameter based at least in part on whether the average of the MIMO sensitivity results satisfies a threshold MIMO sensitivity for the MIMO OTA performance parameter.

19. The non-transitory computer-readable medium of claim 17, wherein the one or more instructions, when executed by the one or more processors, cause the testing equipment to:
select the threshold percentile based at least in part on a power class of the DUT.

20. The non-transitory computer-readable medium of claim 17, wherein the one or more instructions, when executed by the one or more processors, cause the testing equipment to:
select the plurality of directions relative to the DUT based at least in part on satisfaction of a spherical coverage parameter.

21. The non-transitory computer-readable medium of claim 20, wherein the one or more instructions, when executed by the one or more processors to select the plurality of directions relative to the DUT, cause the testing equipment to:
transmit an additional set of test signals from a set of directions relative to the DUT;
obtain, from the DUT, a set of measurements of receiver sensitivity of the DUT for the set of directions based at least in part on the additional set of test signals; and
select the plurality of directions relative to the DUT based at least in part on a determination that corresponding measurements of receiver sensitivity of the DUT satisfy the spherical coverage parameter.

22. The non-transitory computer-readable medium of claim 17, wherein the one or more instructions, when executed by the one or more processors, cause the testing equipment to:
select the plurality of directions relative to the DUT based at least in part on a transmitting power map of the DUT.

23. The non-transitory computer-readable medium of claim 17, wherein the subset of the measured MIMO sensitivity results comprises K sensitivity results, and
wherein the one or more instructions, when executed by the one or more processors, cause the testing equipment to:
compute the average according to:

$$S_X = 10\log\left[\frac{K}{\sum_{i=1}^{K} \frac{1}{10^{\frac{P_i}{10}}}}\right],$$

wherein $P_i$ is a measured MIMO sensitivity result in the subset.

24. An apparatus for wireless communication, comprising:
means for transmitting a set of test signals to a device under test (DUT) from a plurality of directions relative to the DUT;
means for obtaining, from the DUT, a set of measured multiple-input multiple-output (MIMO) sensitivity results based at least in part on the set of test signals; and
means for determining a MIMO over the air (OTA) performance of the DUT based at least in part on an average of a linear scale of a subset of the set of measured MIMO sensitivity results, the subset selected based at least in part on a threshold percentile.

25. The apparatus of claim 24, wherein the means for determining the MIMO OTA performance of the DUT comprise:
means for determining whether the DUT satisfies a MIMO OTA performance parameter based at least in part on whether the average of the MIMO sensitivity results satisfies a threshold MIMO sensitivity for the MIMO OTA performance parameter.

26. The apparatus of claim 24, further comprising:
means for selecting the threshold percentile based at least in part on a power class of the DUT.

27. The apparatus of claim 24, further comprising:
means for selecting the plurality of directions relative to the DUT based at least in part on satisfaction of a spherical coverage parameter.

28. The apparatus of claim 24, further comprising:
means for selecting the plurality of directions relative to the DUT based at least in part on a transmitting power map of the DUT.

29. The apparatus of claim 24, wherein the subset of the measured MIMO sensitivity results comprises K sensitivity results, and
wherein the apparatus comprises:
means for computing the average according to:

$$S_X = 10\log\left[\frac{K}{\sum_{i=1}^{K} \frac{1}{10^{\frac{P_i}{10}}}}\right],$$

wherein $P_i$ is a measured MIMO sensitivity result in the subset.

* * * * *